United States Patent
Yu et al.

(10) Patent No.: US 10,572,603 B2
(45) Date of Patent: Feb. 25, 2020

(54) SEQUENCE TRANSDUCTION NEURAL NETWORKS

(71) Applicant: DeepMind Technologies Limited, London (GB)

(72) Inventors: Lei Yu, Oxford (GB); Christopher James Dyer, London (GB); Tomas Kocisky, London (GB); Philip Blunsom, Oxford (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/403,281

(22) Filed: May 3, 2019

(65) Prior Publication Data

US 2019/0258718 A1    Aug. 22, 2019

Related U.S. Application Data

(63) Continuation of application No. PCT/IB2017/056905, filed on Nov. 4, 2017.
(Continued)

(51) Int. Cl.
*G06F 17/28* (2006.01)
*G06F 17/18* (2006.01)
(Continued)

(52) U.S. Cl.
CPC ......... *G06F 17/2818* (2013.01); *G06F 17/18* (2013.01); *G06F 17/2282* (2013.01); *G06N 3/0445* (2013.01); *G06N 3/0472* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 7,730,079 B2 *    6/2010    Meijer .................. G06F 16/332
                                                               707/760
2008/0306727 A1 *  12/2008    Thurmair ............ G06F 17/2818
                                                               704/4
(Continued)

OTHER PUBLICATIONS

Bahdanau et al, "Neural machine translation by jointly learning to align and translate," Proc. ICLR, 2015, 15 pages.
(Continued)

*Primary Examiner* — Lamont M Spooner
(74) *Attorney, Agent, or Firm* — Fish & Richardson P.C.

(57) ABSTRACT

Methods, systems, and apparatus, including computer programs encoded on a computer storage medium, for generating a target sequence from an input sequence. In one aspect, a method comprises maintaining a set of current hypotheses, wherein each current hypothesis comprises an input prefix and an output prefix. For each possible combination of input and output prefix length, the method extends any current hypothesis that could reach the possible combination to generate respective extended hypotheses for each such current hypothesis; determines a respective direct score for each extended hypothesis using a direct model; determines a first number of highest-scoring hypotheses according to the direct scores; rescores the first number of highest-scoring hypotheses using a noisy channel model to generate a reduced number of hypotheses; and adds the reduced number of hypotheses to the set of current hypotheses.

16 Claims, 3 Drawing Sheets

Related U.S. Application Data (60) Provisional application No. 62/418,170, filed on Nov. 4, 2016.

(51) Int. Cl.
*G06N 3/04* (2006.01)
*G06F 17/22* (2006.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795
USPC .................................................. 704/9, 1, 10
See application file for complete search history.

(56) References Cited

U.S. PATENT DOCUMENTS

| | | | | |
|---|---|---|---|---|
| 2009/0299729 | A1* | 12/2009 | Quirk | G06F 17/2818 704/9 |
| 2015/0186359 | A1* | 7/2015 | Fructuoso | G06F 17/289 704/8 |
| 2015/0356401 | A1* | 12/2015 | Vinyals | G06N 3/02 706/15 |
| 2017/0060855 | A1* | 3/2017 | Song | G06F 17/2818 |
| 2017/0068665 | A1* | 3/2017 | Tamura | G06F 17/2818 |
| 2017/0076199 | A1* | 3/2017 | Zhang | G06F 17/2827 |
| 2017/0140753 | A1* | 5/2017 | Jaitly | G10L 15/26 |
| 2017/0177712 | A1* | 6/2017 | Kopru | G06F 17/289 |
| 2018/0011843 | A1* | 1/2018 | Lee | G06F 17/2854 |
| 2018/0046618 | A1* | 2/2018 | Lee | G06F 17/289 |
| 2018/0107655 | A1* | 4/2018 | Premkumar | G06F 17/289 |
| 2018/0129972 | A1* | 5/2018 | Chen | G06N 3/063 |
| 2018/0261214 | A1* | 9/2018 | Gehring | G10L 15/16 |
| 2018/0341646 | A1* | 11/2018 | Fujiwara | G06F 17/2809 |
| 2019/0130249 | A1* | 5/2019 | Bradbury | G06F 17/2854 |

OTHER PUBLICATIONS

Brill & Moore, "An improved error model for noisy channel spelling correction," Proc. ACL, 2000, 8 pages.
Brown et al, "The mathematics of statistical machine translation: Parameter estimation," Computational Linguistics, 1993, pp. 19:263-311.
Cheng et al, "Semi-supervised learning for neural machine translation," Proc. ACL, 2016, 10 pages.
Chopra et al, "Abstractive sentence summarization with attentive recurrent neural networks," Proc. NACCL, 2016, pp. 93-98.
Durrett & DeNero, "Supervised learning of complete morphological paradigms," HLT-NAACL, 2013, pp. 1185-1195.
Echihabi & Marcu, "A noisy-channel approach to question answering," Proc. ACL, 2003, 9 pages.
Elman, "Finding structure in time," Cognitive science, 1990, pp. 14(2):179-211.
Faruqui et al, "Morphological inflection generation using character sequence to sequence learning," HLT-NAACL, 2016, 10 pages.
Grissom et al, "Don't until the final verb wait: Reinforcement learning for simultaneous machine translation," Empirical Methods in Natural Language Processing, 2014, pp. 1342-1352.
Gu et al, "Learning to translate in real-time with neural machine translation," CoRR, abs/1610.00388, 2016, 10 pages.
Gülçehre et al, "On using monolingual corpora in neural machine translation," CoRR, abs/1503.03535, 2015, 9 pages.
Gülçehre et al, "Pointing the unknown words," CoRR, abs/1603.08148, 2016, 10 pages.
Hochreiter & Schmidhuber, "Long short-term memory," Neural Computation, 1997, pp. 9(8):1735-1780.
Hwang & Sung, "Character-level incremental speech recognition with recurrent neural networks," Proc. ICASSP, 2016, 5 pages.
Jaitly et al, "A neural transducer," NIPS, 2016, 10 pages.
Kalchbrenner & Blunsom, "Recurrent continuous translation models," Proc. EMNLP, 2013, pp. 1700-1709.
Kingma & Ba, "Adam: A method for stochastic optimization," Proc. ICIR, 2015, 15 pages.
Li et al: "Mutual Information and Diverse Decoding Iinprove Neural Machine Translation," 2016.
Miao & Blunsom, "Language as a latent variable: Discrete generative models for sentence compression," Proc. EMNLP, 2016, 9 pages.
Mikolov et al, "Recurrent neural network based language model", Presented at 11th Annual Conference of the International Speech Communication Association, Sep. 2010, 24 pages.
Napoles et al, "Annotated gigaword," Proceedings of the Joint Workshop on Automatic Knowledge Base Construction and Web-scale Knowledge Extraction, 2012, pp. 95-100.
Nicolai et al, "Inflection generation as discriminative string transduction," HLT-NAACL, 2015, pp. 922-931.
PCT International Prelminary Report on Patentability in International Appln. No. PCT/IB2017/056905, dated Jan. 25, 2019, 10 pages.
PCT International Search Report and Written Opinion in International Appln. No. PCT/IB2017/056905, dated Feb. 28, 2018, 17 pages.
Rush et al, "A neural attention model for abstractive sentence summarization," Proc. EMNLP, 2015, 11 pages.
Sankaran et al, "Incremental decoding for phrase-based statistical machine translation," Proc. WMT, 2010, pp. 216-223.
Sennrich et al, "Improving neural machine translation models with monolingual data," Proc. ACL, 2016, 11 pages.
Shannon, "A mathematical theory of communication," Bell System Technical Journal, 1948, pp. 27(3):379-423, 623-656.
Sima'an, "Computational complexity of probabilistic disambiguation by means of treegrammars,"Proc. COLING, 1996, 6 pages.
Sutskever et al, "Sequence to sequence learning with neural networks," In Proc. NIPS, 2014, 9 pages.
Tillmann et al, "A DP-based search using monotone alignments in statistical translation," Proc. EACL, 1997, pp. 289-296.
Vinyals et al, "Pointer networks," Proc. NIPS, 2015, 9 pages.
Yu et al, "Online segment to segment neural transduction," Proc. EMNLP, 2016, 10 pages.
Yu et al, "The Neural Noisy Channel," ICLR, 2017, 12 pages.

* cited by examiner

SEQUENCE TRANSDUCTION NEURAL NETWORKS

CROSS-REFERENCE TO RELATED APPLICATION

This application is a continuation application of, and claims priority to, PCT Patent Application No. PCT/IB2017/056905, filed on Nov. 4, 2017, which application claims the benefit under 35 U.S.C. § 119(e) of U.S. Patent Application No. 62/418,170, filed Nov. 4, 2016. The disclosure of each of the foregoing applications is incorporated herein by reference.

BACKGROUND

This specification relates to generating representations of input sequences using neural networks.

Many data processing tasks involve converting an ordered sequence of inputs into an ordered sequence of outputs. For example, machine translation systems translate an input sequence of words in one language into a sequence of words in another language. As another example, pronunciation systems convert an input sequence of graphemes into a target sequence of phonemes.

SUMMARY

This specification describes a sequence transduction system implemented as computer programs on one or more computers in one or more locations.

The sequence transduction system may be configured to map input sequences to target sequences. For example, the sequence transduction system may implement machine translation by mapping text sequences in a source natural language to translated text sequences in a target natural language. Other applications in the field of natural language processing include document summarization, where the input comprises a document and the output comprises a shorter summary; parsing, where the input comprises a sentence and the output comprises a (linearized) parse tree; pronunciation assistance where the input comprises a sequence of graphemes and the output comprises a sequence of phonemes; and spelling correction, where the input comprises a misspelled word and the output comprises the intended word.

The sequence transduction system has many other applications, for example speech recognition, where the input comprises an encoding of a waveform or spectrum coefficients and the output comprises text; text-to-speech conversion, where the input comprises an encoding of linguistic features associated with how a text should be pronounced and the output comprises a waveform; code generation, where the input comprises a text description of an algorithm and the output comprises a program; and protein secondary structure prediction, where the input comprises an amino acid sequence and the output may be a one-hot vector encoding secondary structure types.

The described sequence transduction system maps an input sequence to a target sequence by iteratively constructing a set of current hypotheses. Each hypothesis has an input prefix and a corresponding target prefix. At each iteration, the sequence transduction system determines a set of extended hypotheses that extend hypotheses in the set of current hypotheses. The sequence transduction system first scores these extended hypotheses by a direct scoring model and identifies a first subset of highest-scoring hypotheses according to the direct model. The sequence transduction system re-scores the first subset of extended hypotheses by a noisy-channel scoring model and identifies a second subset of highest-scoring hypotheses, according to the noisy scoring channel model, from the first subset. The sequence transduction system adds the second subset of extended hypotheses to the set of current hypotheses. When the sequence transduction system determines that none of the current set of hypotheses are candidates for further extension, the sequence transduction system selects a hypothesis from the current set of hypotheses, and the target prefix corresponding to the selected hypothesis is designated as the target sequence.

According to a first aspect there is provided a sequence transduction system and computer-implemented method for generating a target sequence from an input sequence. The method/system is configured to maintain a set of current hypotheses. Each current hypothesis may comprise an input prefix covering a respective first number i inputs in the input sequence. Thus a current hypothesis may take i tokens as an input; these may comprise the input prefix. Here a token may be data item representing an element of the input sequence, in some applications a word or piece of a word. The current hypothesis may also have an output or target prefix of respective length j, that is it may have an associated j output sequence tokens. Thus a hypothesis may comprise a candidate predicted target prefix of length j given i tokens of input prefix. Each current hypothesis may also have a respective score, more particularly a score generated from a model which models a likelihood of the hypothesis, for example based on the target and/or input prefix. The model may be embodied as one or more neural networks, typically including at least one recurrent neural network such as an LSTM network. A hypothesis may be embodied as a data item indexed by i and j storing the data representing the likelihood of the hypothesis; the set of current hypotheses may thus be embodied as a matrix. The method may then perform a number of actions for each of a plurality of the current hypotheses, more particularly for each of a plurality of possible combinations of number of inputs i and target prefix length j, for example for each possible combination of number of inputs i and hypothesis length j. The actions may include extending the current hypothesis to generate a respective extended hypotheses for each such current hypothesis. More particularly any current hypothesis that could reach the possible combination may be extended; a hypothesis that could reach the possible combination may be a hypothesis with a target prefix <=j and with a number of inputs <=i. The extended hypothesis may be a hypothesis extended by one target token, which may, but need not, involve extending the input prefix by one or more input tokens. Thus extending a hypothesis may involve using the hypothesis to generating a further token of the target prefix. The method may then determine a respective first or direct score for each extended hypothesis using a first or direct model. For example the direct score may represent a probability of the target prefix given the input prefix. The method may also determine a first number of highest-scoring hypotheses according to the direct scores. Preferably the method also rescores these highest-scoring hypotheses using a noisy channel model to generate a reduced number of hypotheses. The method may then add the reduced number of hypotheses to the set of current hypotheses and associate each with the corresponding score generated by the rescoring. Such an approach facilitates use of a noisy channel model, which in turn can improve performance and facilitate training, as described later.

In a related aspect there is provided a method of generating a target sequence comprising a respective output at each of a plurality of output time steps from an input sequence comprising a respective input at each of a plurality of input time steps. The method may comprise maintaining data (i) identifying a plurality of current hypotheses, each current hypothesis covering a respective first number i inputs in the input sequence and corresponding to an output hypothesis prefix of respective length j and (ii) a respective model score for each current hypothesis. The method may further comprise, for each possible combination of number of inputs i and hypothesis length j: extending any current hypothesis that could reach the possible combination by considering an additional input in the input sequence to generate a respective extended hypothesis for each such current hypothesis; and determining a respective direct score for each extended hypothesis using an auxiliary direct model. The method may then further comprise determining a first number of highest-scoring hypotheses according to the direct scores; rescoring the first number of highest-scoring hypotheses using a noisy channel model to generate a reduced number of hypotheses; and maintaining the reduced number of hypotheses and associating each with the corresponding score generated by the rescoring for further extension.

In some implementations, the noisy channel model comprises a channel model that generates likelihoods of input prefixes conditioned on target prefixes, and a source model that generates likelihoods of target prefixes. The channel model may thus characterize how well the proposed target prefix explains the input prefix. The source model may provide prior probabilities that characterize whether the proposed target prefix sequence is well-formed. As described later this reduces the risk that the output ignores input data in favor of an intrinsically high-probability output sequence. In addition the source model can be estimated from unpaired samples, which can facilitate training.

In some implementations, the source model is a language model, in particular that generates a likelihood of a last token in a target sequence prefix conditioned on the preceding tokens in the target sequence prefix.

In some implementations, the channel model is a Segment to Segment Neural Transduction (SSNT) model; details of this are provided later. More generally one or both of the channel model the direct model may comprise a recurrent neural network such as an LSTM network. The input prefix and target prefix may each be encoded with a respective recurrent neural network to determine the respective probabilities from the models. These models may be trained using paired input and output sequence samples. In broad terms some implementations of the method alternate between encoding successive portions of the input sequence and decoding output tokens.

The set of current hypotheses may be used to generate the target sequence, in particular by selecting one of the current hypotheses, for example one with a highest score, and then taking the target prefix of the selected hypothesis as the target sequence. Thus in some implementations, the system is further configured to: determine that the set of current hypotheses is complete; and in response, output a hypothesis having a highest score and with corresponding input prefix being the entire input sequence as the target sequence for the input sequence.

In some implementations, the direct model generates probabilities of a target prefix conditioned on an input prefix.

In some implementations, rescoring the first number of highest-scoring hypotheses comprises rescoring the first number of highest-scoring hypotheses using a combination model, and wherein the combination model generates a score for a hypothesis based on the direct model, the noisy channel model, and a length of a target prefix.

In some implementations, the score the combination model generates for a hypothesis is a weighted linear combination of the logarithm of a score that the direct model generates for the hypothesis, the logarithm of a likelihood that the channel model generates for the hypothesis, the logarithm of a likelihood that the source model generates for the hypothesis, and a length of a target prefix of the hypothesis.

In some implementations, the weights of the weighted linear combination are tuned using development data held out of a training data set.

In some implementations, the source model is a recurrent neural network.

In some implementations, the input sequence comprises a sequence of words in an input language, and the target sequence comprises a translation of the sequence of words to a target language.

In some implementations, the input sequence comprises a sequence of words, and the target sequence comprises a sequence of words, in the same language as the input, that has fewer words than the input sequence, but that retains the essential meaning of the input sequence. Thus the system may perform rewording or abstractive summarization of the input sequence.

In some implementations, the input sequence comprises a source word, and the target sequence comprises a target word that is the inflected form of the base form source word, according to a given morphological attribute such as number, tense, person and the like. Thus the system may perform morphological inflection, which can be useful for reducing data sparsity issues in translating morphologically rich languages.

In another aspect there is provided a sequence transduction system for generating a target sequence representing a transduction system output from an input sequence. The system may comprise an input to receive the input sequence; an output to provide the target sequence; a first, direct scoring model to score a candidate predicted output sequence prefix according to a probability of the predicted output sequence prefix given an input sequence prefix; and a second, noisy channel model to score the candidate predicted output sequence based at least in part on a probability of the input sequence prefix given the predicted output sequence prefix. A hypothesis generation system may be coupled to the input, to the first model and to the second model, to generate a hypothesis comprising the candidate predicted output sequence for scoring by the first and second models. The hypothesis generation system may be configured to iteratively construct a set of current hypotheses, each current hypothesis having an input prefix from the input sequence and a corresponding target prefix defining a prefix part of the target sequence. At each iteration the sequence transduction system may be configured to: determine a set of extended hypotheses that extend hypotheses in the set of current hypotheses by extending the target prefix; score the extended hypotheses using the direct scoring model to identify a first subset of highest-scoring hypotheses according to the direct model; re-score the first subset of extended hypotheses using the noisy-channel scoring model to identify a second subset of highest-scoring hypotheses according to the noisy scoring channel model, from the first subset; and determine whether any/that none of the current set of hypotheses are candidates for further extension. The system may, in response, select a hypothesis from the current set of hypotheses and output the target prefix corresponding to the selected hypothesis as the target sequence.

Particular embodiments of the subject matter described in this specification can be implemented so as to realize one or more of the following advantages. The sequence transduction system as described in this specification scores hypotheses using both a noisy channel model and a direct model, and therefore achieves better performance on sequence transduction tasks than conventional sequence transduction systems. For example, the performance of conventional sequence transduction systems can suffer as a result of "explaining away" effects that result from scoring using only a direct model. "Explaining away" is a term referring to a pattern in inference in locally normalized conditional probability models where observation of a highly predictive underlying cause results in the model ignoring alternative underlying causes. In the sequence transduction case, there are two underlying causes for extending a target prefix: the input sequence that is being transduced, and the target prefix that is being extended. In cases where the target prefix is highly predictive (e.g., if for many target sequences, the sub-sequence "AB" is followed by "C"), explaining away can cause conventional sequence transduction systems relying on direct models to ignore the input prefix and extend the target prefix based on the predictive pattern observed in target sequences, possibly resulting in erroneous transduction. Using a noisy channel model mitigates explaining away effects since the score generated by the noisy channel model additionally depends on the probability that the input prefix is an accurate transduction of the target prefix.

Moreover, in many domains, vastly more unpaired target sequences are available than input-target pairs; for example, Swahili-English translations are rare although English text is abundant. Conventional sequence transduction systems using only direct models rely on training data consisting of input-target pairs. The sequence transduction system described in this specification uses a noisy channel model and can exploit both input-target pairs and unpaired target sequences for training, and therefore achieves better performance than conventional sequence transduction systems by augmenting the limited set of paired training data with unpaired target sequences.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
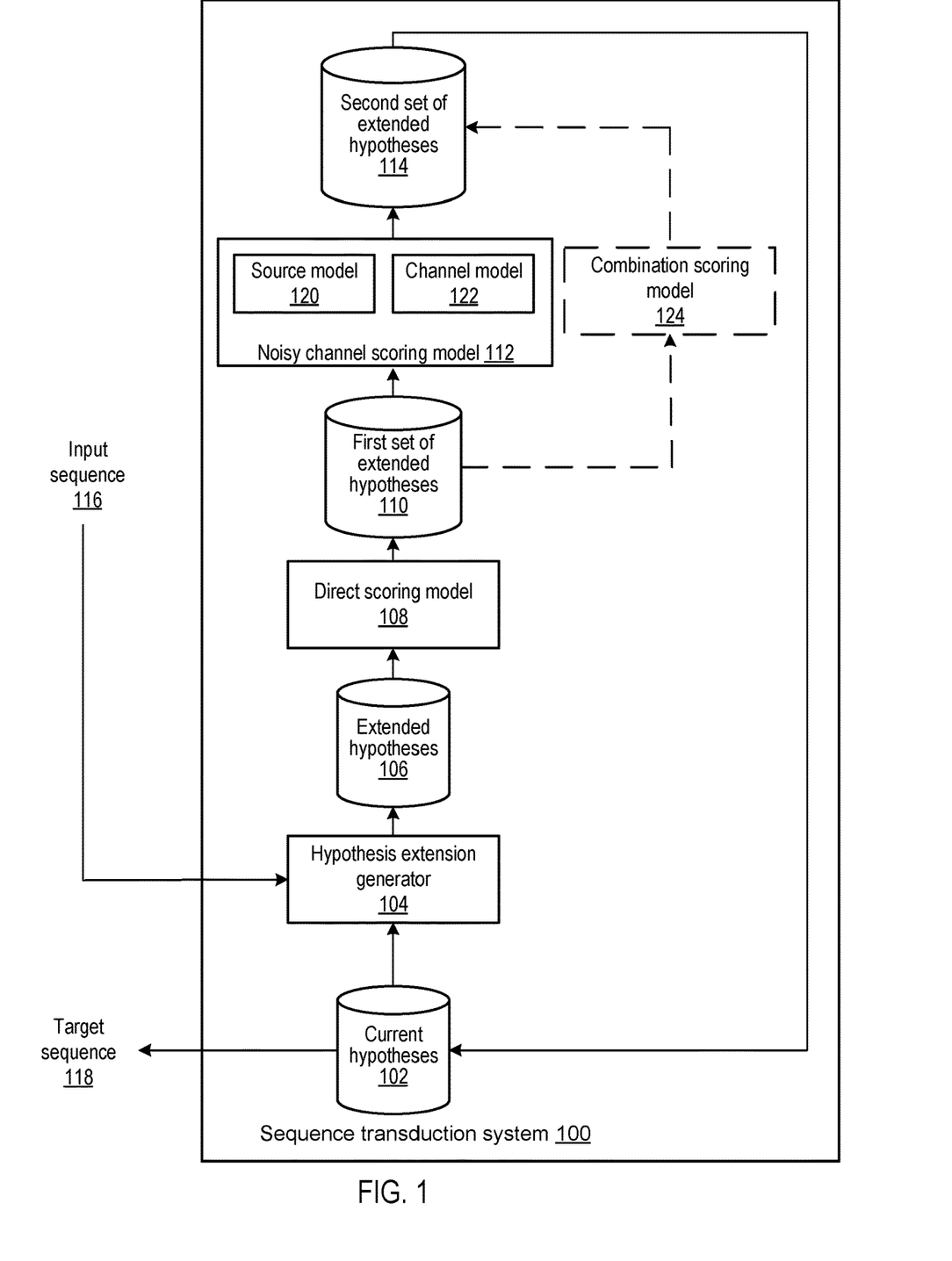
FIG. 1 shows an example sequence transduction system.

FIG. 1 shows an example sequence transduction system 100. The sequence transduction system 100 is an example of a system implemented as computer programs on one or more computers in one or more locations in which the systems, components, and techniques described below are implemented.

The sequence transduction system 100 is configured to map an input sequence 116 of tokens to a target sequence 118 of tokens by iteratively augmenting a set of current hypotheses 102. Each hypothesis in the set of current hypotheses 102 has an input prefix and a corresponding target prefix. An input prefix is a sub-sequence of the input sequence that includes consecutive tokens of the input sequence starting from the first token of the input sequence. A target prefix is a sub-sequence of a target sequence that includes consecutive tokens of the target sequence starting from the first token of the target sequence. For example, if an input sequence is "My name is John", then a hypothesis could have input prefix "My name" and target prefix "Mon nom". The tokens may be characters, word-like units, i.e. parts of words, or words; other symbols, states or parameters, or vectors encoding these, or other data items. The token type of the input sequence may be different to that of the target sequence.

In some implementations, the input sequence 116 is a sequence of words in a source natural language, and the corresponding target sequence 118 is the translation of the input sequence 116 into a target language. For example, the input sequence 116 may be "My name is John", while the corresponding target sequence 118 may be "Mon nom est John", i.e. the translation of the English input sequence 116 into French. In these implementations, the tokens can be word-like units or words.

In some other implementations, the input sequence 116 is a sequence of words, and the target sequence 118 is a sequence of words that has fewer words than the input sequence 116 but that retains the essential meaning of the input sequence 116. For example, the input sequence 116 may be "Vietnam will accelerate the export of industrial goods mainly by developing auxiliary industries according to the Ministry of Industry on Thursday", while the corresponding target sequence 118 may be "Vietnam to boost industrial goods exports". In these implementations, the tokens can be word-like units or words.

In some other implementations, the input sequence 116 is a source word, and the target sequence 118 is a target word that is the inflected form of the source word, according to a given morphological attribute. For example, the input sequence 116 may be "leaf", the morphological attribute may be "plural", and the corresponding target sequence 118 may be the word "leaves". In these implementations, the tokens are characters.

The system 100 includes a hypothesis extension generator 104 that generates extended hypotheses 106 that extend hypotheses in the set of current hypotheses 102. The hypothesis extension generator 104 generates an extended hypothesis from a hypothesis in the set of current hypotheses 102 by extending the target prefix of the hypothesis by one target token and either not extending the input prefix or extending the input prefix by one or more input tokens. For example, if a current hypothesis has input prefix "My name" and target prefix "Mon nom" and the tokens of the input and target sequences are words, then an extension of this hypothesis might have input prefix "My name is" and target prefix "Mon nom est". Thus, for example, a hypothesis may be provided by a recurrent neural network system having an encoder-decoder architecture, and a hypothesis may be extended by using the recurrent neural network system to predict a next token in the target sequence. This may, but need not necessarily, consume a token from the input sequence. When extending the hypotheses the system may extend some or all of the current hypotheses that are capable of generating a target sequence of length j from an input sequence of length i. In some implementations a hypothesis may comprise a cell [i,j] of a probability path matrix similar to a Viterbi matrix, storing a probability value; the system may iteratively (recursively) extend from previous cells to cell [i,j].

The system 100 includes a direct scoring model 108 that scores each of the extended hypotheses 106. The direct scoring model 108 generates a score for each extended hypothesis in the set of extended hypotheses 106 equal to the probability of the target prefix of the extended hypothesis conditioned on the input prefix of the extended hypothesis, i.e. the probability that the target prefix is an accurate transduction of the input prefix. In some implementations, the direct scoring model may be a Segment to Segment Neural Transduction (SSNT) model, as described in detail in Lei Yu, Jan Buys, Phil Blunsom, "Online Segment to Segment Neural Transduction", Proc. EMNLP, 2016, arXiv: 1609.08194. In broad terms this model includes a latent alignment variable z, where $z_j=i$ denotes that the output token at position j is generated when the input sequence up through position i has been read. Thus the model may determine how much of x is needed to model the jth token of y, allowing prediction of the output sequence to start before the complete input sequence is observed. This can be helpful for online applications.

The direct scoring model 108 is trained based on a set of training data that includes pairs of input sequences and corresponding target sequences.

The system 100 selects the $K_1$ extended hypotheses with the highest scores according to the scores generated by the direct scoring model 108 as the first set of extended hypotheses 110, where $K_1$ is a predetermined positive integer.

In some implementations, the system 100 re-scores the first set of extended hypotheses 110 by a noisy-channel scoring model 112. The noisy channel scoring model 112 generates a score for an extended hypothesis by multiplying together a probability of the extended hypothesis generated by a channel model 122 and a probability of the extended hypothesis generated by a source model 120.

The channel model 122 generates the probability of the input prefix of the extended hypothesis conditioned on the target prefix of the extended hypothesis, i.e. the probability that the input prefix is an accurate transduction of the target prefix. The channel model 122 is trained based on a set of training data that includes pairs of input sequences and corresponding target sequences. For example, the channel model may be a Segment to Segment Neural Transduction (SSNT) model—see "Online Segment to Segment Neural Transduction", Proc. EMNLP, 2016.

The source model 120 generates the probability of the target prefix of the extended hypothesis. In general the source model 120 is a language model, in which case the source model 120 generates the prior probability that the target prefix corresponds to a prefix of a meaningful phrase in the natural language of the target sequence. For example, the source model 120 can be configured to generate the probability of the last token in the target prefix conditioned on the preceding tokens in the prefix, i.e., the probability that the last token in the target prefix would follow the preceding tokens in a meaningful phrase in the natural language of the target sequence. In some implementations, the source model 120 is a recurrent neural network. Examples of language models that can be used as the source model 120 are described in "Recurrent neural network based language model", Interspeech, Vol. 2, 2010. The source model 120 is trained based on a set of training data that includes target sequences.

In some other implementations, the system 100 re-scores the first set of extended hypotheses 110 by a combination scoring model 124 based on a combination of the noisy channel scoring model 112 and the direct scoring model 108. The combination scoring model 124 is described in more detail with reference to FIG. 2.

The system 100 identifies a second set of extended hypotheses 114, that is a subset of the first set of extended hypotheses 110, based on re-scoring the first set of extended hypotheses 110 by the noisy channel scoring model 112 or the combination scoring model 124 and selecting the $K_2$ highest-scoring extended hypotheses for inclusion in the second set of extended hypotheses, where $K_2$ is a positive integer that is less than $K_1$.

The system 100 adds the second set of extended hypotheses 114 to the set of current hypotheses 102. When the system 100 determines that the set of current hypotheses 102 is complete, the system 100 selects a hypothesis from the set of current hypotheses 102, and the target prefix corresponding to the selected hypothesis is designated as the target sequence 118. Specifically, the system 100 selects a current hypothesis that has the highest score, i.e. score according to the noisy channel scoring model 112 or the combination scoring model 124, amongst all current hypotheses whose inputs prefixes correspond to the entire input sequence 116.

The value of the parameter $K_1$, that determines the number of highest-scoring hypotheses according to the direct scoring model 108, the value of the parameter $K_2$, that determines the number of highest-scoring hypotheses according to the noisy channel model 112 or combination scoring model 124, and other parameters of the system, can be tuned by comparing the performance of the system according to a performance measure on a set of development data held out of a set of training data with different settings of the parameters, and selecting the values of parameters which yield the best performance. For example, if the system implements machine translation, then the performance measure may be the BLEU score.

Generating a target sequence from an input sequence using the system 100 is described in more detail below with reference to FIG. 2.

Figure 2:
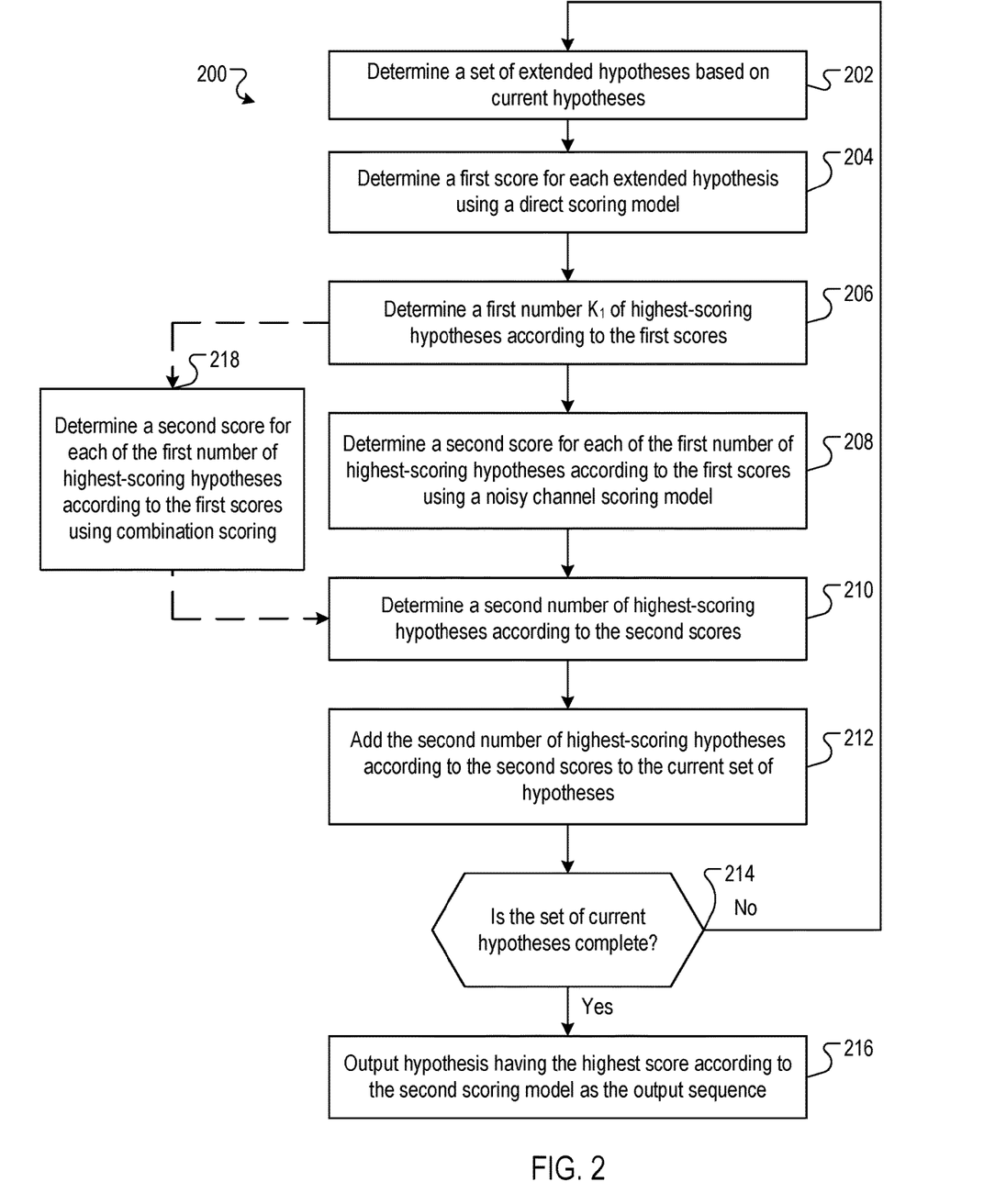
FIG. 2 is a flow diagram of an example process for generating a target sequence from an input sequence.

FIG. 2 is a flow diagram of an example process 200 for generating a target sequence from an input sequence. For convenience, the process 200 will be described as being performed by a system of one or more computers located in one or more locations. For example, a sequence transduction system, e.g., the sequence transduction system 100 of FIG. 1, appropriately programmed in accordance with this specification, can perform the process 200.

The system performs multiple iterations of the process 200 in order to generate a target sequence from an input sequence. In particular, at each iteration, the system updates a maintained set of current hypotheses. Each hypothesis in the set of current hypotheses is associated with parameters i and j, where i is the length of the input prefix of the hypothesis and j is the length of the target prefix of the hypothesis. In this specification, the length of a prefix refers to the number of tokens in the prefix.

The system determines a set of extended hypotheses based on the set of current hypotheses (step 202). One example way of determining the set of extended hypotheses is described below with reference to process 300 of FIG. 3. Each extended hypothesis for the iteration has some input prefix length i and some target prefix length j. In general, each extended hypothesis with input prefix length i and target prefix length j extends a current hypothesis with input prefix length of less than or equal to i and target prefix length of (j−1).

The system determines a first score for each extended hypothesis in the set of extended hypotheses using a direct scoring model (step 204). The direct scoring model generates a score for each extended hypothesis equal to the probability of the target prefix of the extended hypothesis conditioned on the input prefix of the extended hypothesis, i.e. the probability that the target prefix is an accurate transduction of the input prefix.

The system determines a first number $K_1$ of extended hypotheses that have the highest scores according to the direct scoring model, where $K_1$ is a positive integer (step 206).

The system determines a second score for each of the $K_1$ extended hypotheses with the highest first scores (step 208).

In some implementations, the system determines the second score for each of the $K_1$ extended hypotheses using a noisy channel scoring model (step 208). The noisy channel scoring model generates a score for an extended hypothesis by multiplying together a probability of the extended hypothesis generated by a channel model and a probability of the extended hypothesis generated by a source model. The channel model generates the probability of the input prefix of the extended hypothesis conditioned on the target prefix of the extended hypothesis, i.e. the probability that the input prefix is an accurate transduction of the target prefix. The source model generates the probability of the target prefix of the extended hypothesis. In general the source model is a language model, in which case the source model generates the prior probability that the target prefix corresponds to a prefix of a meaningful phrase in the natural language of the target sequence.

In some other implementations, the system determines the second score for each of the $K_1$ extended hypotheses by a combination score based on the direct scoring model and the noisy channel scoring model. For example, the score generated by the combination scoring model for an extended hypothesis may be defined by:

$$\lambda_i \log p(y^j|x^i) + \lambda_2 \log p(x^i|y^j) + \lambda_3 \log p(y^j) + \lambda_4 |y^j|$$

where $y^j$ is the target prefix of the extended hypothesis, $x^i$ is the input prefix of the extended hypothesis, $p(y^j|x^i)$ is the score of the extended hypothesis generated by the direct scoring model, $p(x^i|y^j)$ is the probability of the extended hypotheses generated by the channel model, $p(y^j)$ is the probability of the target prefix generated by the source model, and $|y^j|$ is the length of the target prefix.

The system determines a second number $K_2$ of highest-scoring extended hypotheses according to the second scores from the set of $K_1$ highest scoring extended hypotheses according to the first scores, where $K_2$ is a positive integer less than or equal to $K_1$ (step 210).

The system adds the determined $K_2$ highest-scoring extended hypotheses according to the second scores from the set of $K_1$ highest scoring extended hypotheses according to the first scores to the current set of hypotheses (step 212). Each of the determined extended hypotheses added to the current set of hypotheses is associated with a score. In some implementations, the score associated with an extended hypothesis is the second score generated for the extended hypothesis by the noisy channel scoring model. In some other implementations, the score associated with the extended hypothesis is the second score generated for the extended hypothesis by the combination scoring model.

The system determines whether the set of current hypotheses is complete (step 214).

If, as of the current iteration of the process 200, the system has generated extended hypotheses for every input prefix length i between 1 and I, where I is the length of the input sequence, and for every target prefix length j between 1 and J, where J is a maximum length for the target sequence, then the system determines that the set of current hypotheses is complete. In this case, the system identifies a current hypothesis that has input prefix length I and has the highest associated score from amongst the set of all current hypotheses that have input prefix length I, i.e. an input prefix corresponding to the entire input sequence. Then, the system designates the target prefix of the determined hypothesis as the output target sequence corresponding to the input sequence (step 216).

If the system determines that the set of current hypotheses is not complete, i.e. that there is an input prefix length i between 1 and I and a target prefix length j between 1 and J for which the system has not previously generated extended hypotheses, the process returns to step 202 and repeats the preceding steps to generate extended hypotheses with an input prefix length i between 1 and I and a target prefix length j between 1 and J for which the system has not previously generated extended hypotheses.

Figure 3:
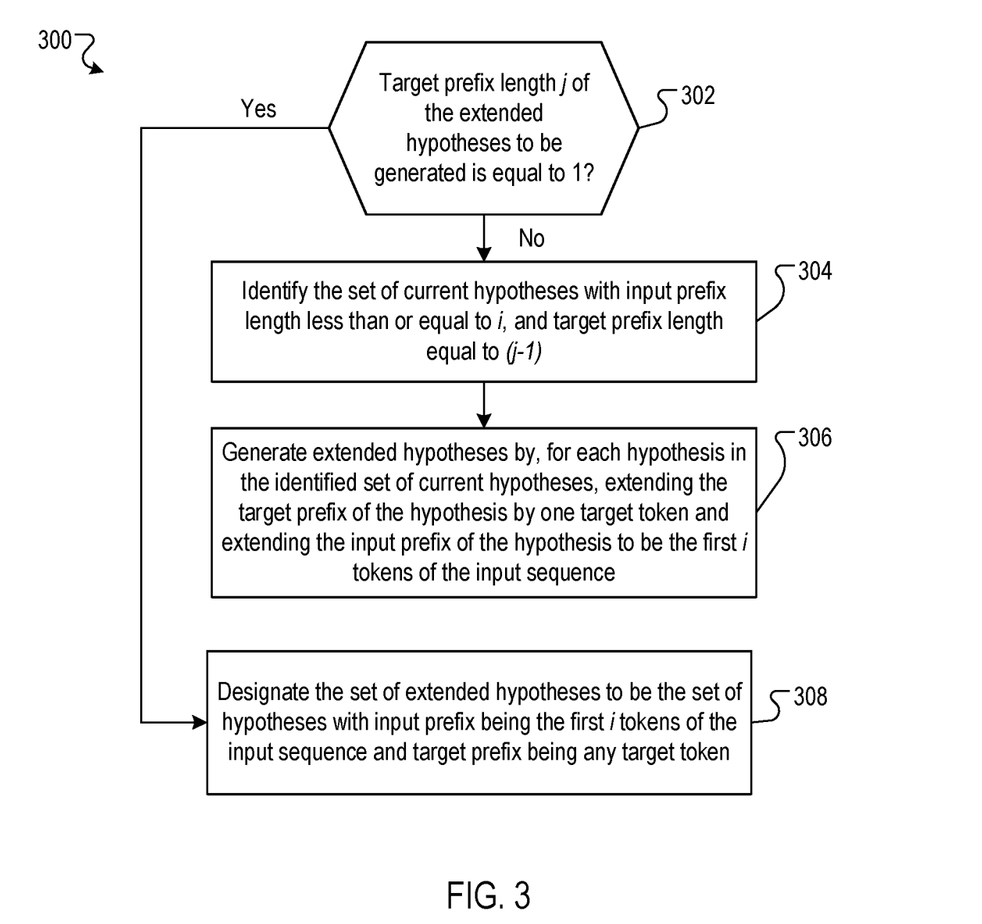
FIG. 3 is a flow diagram of an example process for generating extended hypotheses from current hypotheses.

FIG. 3 is a flow diagram of an example process 300 for generating extended hypotheses from current hypotheses. For convenience, the process 300 will be described as being performed by a system of one or more computers located in one or more locations. For example, a sequence transduction system, e.g., the sequence transduction system 100 of FIG. 1, appropriately programmed in accordance with this specification, can perform the process 300.

The process 300 is described with reference to fixed values of input prefix length i and target prefix length j that correspond to the desired input prefix length and target prefix length for the extended hypotheses to be generated by the process 300.

If the target prefix length j of the extended hypotheses to be generated is equal to 1 (step 302), then the system designates the set of extended hypotheses to be the set of hypotheses with the input prefix being the first i tokens of the input sequence, and target prefix being any target token (step 308). For example, if the target sequences are text sequences written in English, then the target tokens could be the Roman alphabet.

If the target prefix length j of the extended hypotheses to be generated is greater than 1 (step 302), then the system identifies the hypotheses in the set of current hypotheses with input prefix length less than or equal to i, and target prefix length equal to (j−1) (step 304).

The system generates extended hypotheses by, for each identified hypothesis in the set of current hypotheses, extending the target prefix of the hypothesis by one target token and extending the input prefix of the hypothesis to be the first i tokens of the input sequence (step 306).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method of generating a target sequence from an input sequence, the method comprising:
    maintaining a set of current hypotheses, wherein each current hypothesis comprises an input prefix covering a respective first number i inputs in the input sequence and a target prefix of respective length j, and wherein each current hypothesis has a respective model score; and
    for each of a plurality of possible combinations of number of inputs i and output prefix length j:
        iteratively extending one or more current hypotheses from the set of current hypotheses to reach the possible combination by:
        i) for each of the one or more current hypotheses, extending the target prefix of the current hypothesis by one target token and either not extending the input prefix or extending the input prefix by one or more input tokens, to generate an iteratively extended hypothesis for the current hypothesis; and
        ii) determining a respective direct score for each iteratively extended hypothesis using a direct model, wherein the direct model is trained to generate, for a given iteratively extended hypothesis, a direct score that represents a likelihood that the target prefix in the given iteratively extended hypothesis is an accurate transduction of the input prefix in the given iteratively extended hypothesis;
        iii) determining a first number of highest-scoring hypotheses of the iteratively extended hypotheses according to the direct scores generated by the direct model;
        iv) rescoring the first number of highest-scoring hypotheses of the iteratively extended hypotheses using a noisy channel model to generate a reduced number of hypotheses, wherein the noisy channel model comprises:
            a channel model that is trained to generate, for the given iteratively extended hypothesis, a channel score that represents a likelihood that the input prefix of the given iteratively extended hypothesis is an accurate transduction of the target prefix of the given iteratively extended hypothesis; and
            a source model that is trained to generate, for the given iteratively extended hypothesis, a source score that represents a likelihood of the target prefix in the iteratively extended hypothesis occurring in target sequences; and
        v) adding the reduced number of hypotheses to the set of current hypotheses and associating each with the corresponding score generated by the rescoring;
    wherein the input sequence comprises a sequence of words in an input language, and the target sequence comprises a translation of the sequence of words to a target language.

2. The method of claim 1, wherein extending the current hypothesis comprises extending any current hypothesis that could reach the possible combination to generate respective extended hypotheses for each such current hypothesis.

3. The method of claim 1, wherein the source model is a language model that generates a likelihood of a last token in the target prefix conditioned on the preceding tokens in the target prefix.

4. The method of claim 1, wherein the channel model is a Segment to Segment Neural Transduction (SSNT) model.

5. The method of claim 1, wherein the method further comprises:

determining that the set of current hypotheses is complete; and in response, outputting a hypothesis having a highest score and with corresponding input prefix being the entire input sequence as the target sequence for the input sequence.

6. The method of claim 1, wherein rescoring the first number of highest-scoring hypotheses comprises rescoring the first number of highest-scoring hypotheses using a combination model, and wherein the combination model generates a score for a hypothesis based on the direct model, the noisy channel model, and a length of a target prefix.

7. The method of claim 6, wherein the score the combination model generates for a hypothesis is a weighted linear combination of the logarithm of a direct score that the direct model generates for the hypothesis, the logarithm of a channel score that the channel model generates for the hypothesis, the logarithm of a source score that the source model generates for the hypothesis, and a length of a target prefix of the hypothesis.

8. The method of claim 7, wherein weights of the weighted linear combination are tuned using development data held out of a training data set.

9. The method of claim 1, wherein the source model is a recurrent neural network.

10. One or more non-transitory computer storage media encoded with instructions that, when executed by one or more computers, cause the one or more computers to perform operations comprising:

maintaining a set of current hypotheses, wherein each current hypothesis comprises an input prefix covering a respective first number i inputs in the input sequence and a target prefix of respective length j, and wherein each current hypothesis has a respective model score; and for each of a plurality of possible combinations of number of inputs i and output prefix length j:
  iteratively extending one or more current hypotheses from the set of current hypotheses to reach the possible combination by:
  i) for each of the one or more current hypotheses, extending the target prefix of the current hypothesis by one target token and either not extending the input prefix or extending the input prefix by one or more input tokens, to generate an iteratively extended hypothesis for the current hypothesis; and
  ii) determining a respective direct score for each iteratively extended hypothesis using a direct model, wherein the direct model is trained to generate, for a given iteratively extended hypothesis, a direct score that represents a likelihood that the target prefix in the given iteratively extended hypothesis is an accurate transduction of the input prefix in the given iteratively extended hypothesis;
  iii) determining a first number of highest-scoring hypotheses of the iteratively extended hypotheses according to the direct scores;
  iv) rescoring the first number of highest-scoring hypotheses of the iteratively extended hypotheses using a noisy channel model to generate a reduced number of hypotheses, wherein the noisy channel model comprises:
    a channel model that is trained to generate, for the given iteratively extended hypothesis, a channel score that represents a likelihood that the input prefix of the given iteratively extended hypothesis is an accurate transduction of the target prefix of the given iteratively extended hypothesis; and
    a source model that is trained to generate, for the given iteratively extended hypothesis, a source score that represents a likelihood of the target prefix in the iteratively extended hypothesis occurring in target sequences; and
  v) adding the reduced number of hypotheses to the set of current hypotheses and associating each with the corresponding score generated by the rescoring; wherein the input sequence comprises a sequence of words in an input language, and the target sequence comprises a translation of the sequence of words to a target language.

11. The non-transitory computer storage media of claim 10, wherein extending the current hypothesis comprises extending any current hypothesis that could reach the possible combination to generate respective extended hypotheses for each such current hypothesis.

12. The non-transitory computer storage media of claim 10, wherein the source model is a language model that generates a likelihood of a last token in a target sequence conditioned on the preceding tokens in the target sequence.

13. The non-transitory computer storage media of claim 10, wherein the channel model is a Segment to Segment Neural Transduction (SSNT) model.

14. The non-transitory computer storage media of claim 10, wherein the operations further comprise:

determining that the set of current hypotheses is complete; and in response, outputting a hypothesis having a highest score and with corresponding input prefix being the entire input sequence as the target sequence for the input sequence.

15. A system comprising:

one or more computers; and one or more storage devices communicatively coupled to the one or more computers, wherein the one or more storage devices store instructions that, when executed by the one or more computers, cause the one or more computers to perform operations comprising:

maintaining a set of current hypotheses, wherein each current hypothesis comprises an input prefix covering a respective first number i inputs in the input sequence and a target prefix of respective length j, and wherein each current hypothesis has a respective model score; and for each of a plurality of possible combinations of number of inputs i and output prefix length j:
  iteratively extending one or more current hypotheses from the set of current hypotheses to reach the possible combination by:
  i) for each of the one or more current hypotheses, extending the target prefix of the current hypothesis by one target token and either not extending the input prefix or extending the input prefix by one or more input tokens, to generate an iteratively extended hypothesis for the current hypothesis; and
  ii) determining a respective direct score for each iteratively extended hypothesis using a direct model, wherein the direct model is trained to generate, for a given iteratively extended hypothesis, a direct score that represents a likelihood that the target prefix in the given iteratively extended hypothesis is an accurate transduction of the input prefix in the given iteratively extended hypothesis;

iii) determining a first number of highest-scoring hypotheses of the iteratively extended hypotheses according to the direct scores;
iv) rescoring the first number of highest-scoring hypotheses of the iteratively extended hypotheses using a noisy channel model to generate a reduced number of hypotheses, wherein the noisy channel model comprises:
   a channel model that is trained to generate, for the given iteratively extended hypothesis, a channel score that represents a likelihood that the input prefix of the given iteratively extended hypothesis is an accurate transduction of the target prefix of the given iteratively extended hypothesis; and
   a source model that is trained to generate, for the given iteratively extended hypothesis, a source score that represents a likelihood of the target prefix in the iteratively extended hypothesis occurring in target sequences; and
v) adding the reduced number of hypotheses to the set of current hypotheses and associating each with the corresponding score generated by the rescoring; wherein the input sequence comprises a sequence of words in an input language, and the target sequence comprises a translation of the sequence of words to a target language.

16. The system of claim 15, wherein extending the current hypothesis comprises extending any current hypothesis that could reach the possible combination to generate respective extended hypotheses for each such current hypothesis.

* * * * *